United States Patent
Baughman et al.

(10) Patent No.: US 10,620,997 B2
(45) Date of Patent: *Apr. 14, 2020

(54) SOCIAL OBJECTIVES-BASED WORKLOAD RESOLUTION IN A CLOUD ENVIRONMENT

(71) Applicant: International Business Machines Corporation, Armonk, NY (US)

(72) Inventors: Aaron K. Baughman, Silver Spring, MD (US); John S. Cope, Richmond, VA (US); Michelle Welcks, Austin, TX (US); Brian M. O'Connell, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/188,401

(22) Filed: Nov. 13, 2018

(65) Prior Publication Data

US 2019/0079798 A1 Mar. 14, 2019

Related U.S. Application Data

(63) Continuation of application No. 15/237,574, filed on Aug. 15, 2016, now Pat. No. 10,162,676.

(51) Int. Cl.
*G06F 9/50* (2006.01)
*G06F 9/48* (2006.01)
(Continued)

(52) U.S. Cl.
CPC ............ *G06F 9/50* (2013.01); *G06F 9/45533* (2013.01); *G06F 9/48* (2013.01); *G06F 9/485* (2013.01);
(Continued)

(58) Field of Classification Search
CPC ........ G06F 9/48; G06F 9/4806; G06F 9/4843; G06F 9/485; G06F 9/4856; G06F 9/4875;
(Continued)

(56) References Cited

U.S. PATENT DOCUMENTS 8,739,172 B2 * 5/2014 Prakash .............. G06F 9/45558
718/104
9,268,612 B2 * 2/2016 Hintermeister ....... G06F 9/5027
(Continued)

OTHER PUBLICATIONS

List of all IBM Related Applications, Appendix P, 2018.

*Primary Examiner* — Charles M Swift
(74) *Attorney, Agent, or Firm* — Garg Law Firm, PLLC; Rakesh Garg; James Nock

(57) ABSTRACT

A content of a social media data is analyzed. The social media data relates to a workload that is to be located on a node. A location corresponding to the social media data is computed. The social media data is regarded as originating from the location. A set of nodes is selected by computing a social distance objective function, the set of nodes includes the node. Each node in the set of nodes is located within a range of distances specified by the social distance objective function. A first subset of nodes is removed from the set of nodes, where the first subset of nodes fails to satisfy another objective function. In response to a second subset of nodes satisfying the social distance objective function and the other objective function, the node is selected from the second subset and the workload is deployed on the node.

18 Claims, 7 Drawing Sheets

(51) Int. Cl.
*H04L 29/08* (2006.01)
*G06Q 50/00* (2012.01)
*G06Q 10/10* (2012.01)
*G06F 9/455* (2018.01)

(52) U.S. Cl.
CPC .......... *G06F 9/4806* (2013.01); *G06F 9/4843* (2013.01); *G06F 9/4856* (2013.01); *G06F 9/4875* (2013.01); *G06F 9/4881* (2013.01); *G06F 9/4887* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5033* (2013.01); *G06F 9/5061* (2013.01); *G06F 9/5072* (2013.01); *G06F 9/5077* (2013.01); *G06F 9/5083* (2013.01); *G06F 9/5088* (2013.01); *G06Q 10/10* (2013.01); *G06Q 50/01* (2013.01); *H04L 67/1021* (2013.01); *H04L 67/1031* (2013.01); *H04L 67/18* (2013.01)

(58) Field of Classification Search
CPC ........ G06F 9/4881; G06F 9/4887; G06F 9/50; G06F 9/5025; G06F 9/5011; G06F 9/5016; G06F 9/5022; G06F 9/5027; G06F 9/5033; G06F 9/5061; G06F 9/5072; G06F 9/5077; G06F 9/5083; G06F 9/5088
See application file for complete search history.

(56) References Cited

U.S. PATENT DOCUMENTS

| | | | | |
|---|---|---|---|---|
| 9,811,387 | B2* | 11/2017 | Baughman | H04L 67/12 |
| 2009/0228589 | A1* | 9/2009 | Korupolu | H04L 67/1097 709/226 |
| 2010/0229175 | A1* | 9/2010 | Gonzalez, Jr. | G06F 9/5077 718/104 |
| 2012/0137285 | A1* | 5/2012 | Glikson | G06F 9/4856 718/1 |
| 2013/0042123 | A1* | 2/2013 | Smith | G06F 9/5077 713/300 |
| 2014/0201218 | A1* | 7/2014 | Catalano | G06Q 10/0631 707/748 |
| 2014/0258533 | A1* | 9/2014 | Antony | H04L 29/08144 709/226 |
| 2014/0280547 | A1* | 9/2014 | DeCusatis | H04L 67/34 709/204 |
| 2014/0280978 | A1* | 9/2014 | Martinez | H04L 41/5032 709/226 |
| 2015/0007178 | A1* | 1/2015 | Kaneko | G06F 9/5088 718/1 |
| 2015/0032894 | A1* | 1/2015 | Rosensweig | H04L 41/5019 709/226 |
| 2015/0200981 | A1* | 7/2015 | Garrick | H04L 43/10 709/204 |
| 2016/0284125 | A1* | 9/2016 | Bostick | G06T 19/006 |
| 2017/0220394 | A1* | 8/2017 | Shim | G06F 9/5044 |
| 2017/0235830 | A1* | 8/2017 | Smith | H04L 51/32 707/748 |

* cited by examiner

SOCIAL OBJECTIVES-BASED WORKLOAD RESOLUTION IN A CLOUD ENVIRONMENT

TECHNICAL FIELD

The present invention relates generally to a method, system, and computer program product for deploying or placing a workload at a suitable node in a cloud computing environment. More particularly, the present invention relates to a method, system, and computer program product for social objectives-based workload resolution in a cloud environment.

BACKGROUND

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. A cloud model may include any of the at least five characteristics, which are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

A cloud model may further include any of the at least three service models, which are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

A cloud model may further include any of the at least four deployment models, which are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Physical networks usually exist within the demarcated boundary of the data processing environment whose physical components are utilized in the physical network. Unlike a physical network, a software defined network (SDN) can be designed to span across one or more data processing environment. For example, while a physical network may be contained within a datacenter, an SDN may span across one or more datacenters. An SDN is a logical network of virtualized physical data processing systems and networking components (collectively, "physical computing resources"). Essentially, the physical computing resources are abstracted into corresponding logical or virtual representations, and the abstractions are used to define the SDN. In other words, an SDN is a logical network formed and operated using logical representations of the underlying physical computing resources.

A workload that is processed in a cloud can take the form of a software application or a process that is executed using the computing resources of one or more logical or physical data processing systems available in the cloud. Depending on the requirements of the workload, a suitable data processing system has to be selected such that the data processing system at least meets those requirements.

Because the cloud can be geographically spread across a region of any size—e.g., across a city, state, country, or the globe—the data processing systems that are usable for processing the workload in different geographical regions. The process of selecting a suitable data processing system in a suitable geographical location for meeting a given workload's requirements in processing the workload is known as 'resolving' the workload or a 'resolution' of a workload.

SUMMARY

The illustrative embodiments provide a method, system, and computer program product. An embodiment includes a method that analyzes, using a processor and a memory, a content of a social media data, the social media data relating to a workload that is to be located on a node. The embodiment computes, using the processor and the memory, a location corresponding to the social media data, wherein the social media data is regarded as originating from the location. The embodiment selects, using the processor and the memory, a set of nodes by computing a social distance objective function, the set of nodes including the node, and wherein each node in the set of nodes is located within a range of distances specified by the social distance objective function. The embodiment removes, using the processor and the memory, from the set of nodes a first subset of nodes, wherein the first subset of nodes fails to satisfy another objective function. The embodiment selects, using the processor and the memory, responsive to a second subset of nodes satisfying the social distance objective function and the other objective function, the node from the second subset. The embodiment deploys, using the processor and the memory, the workload at the node.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
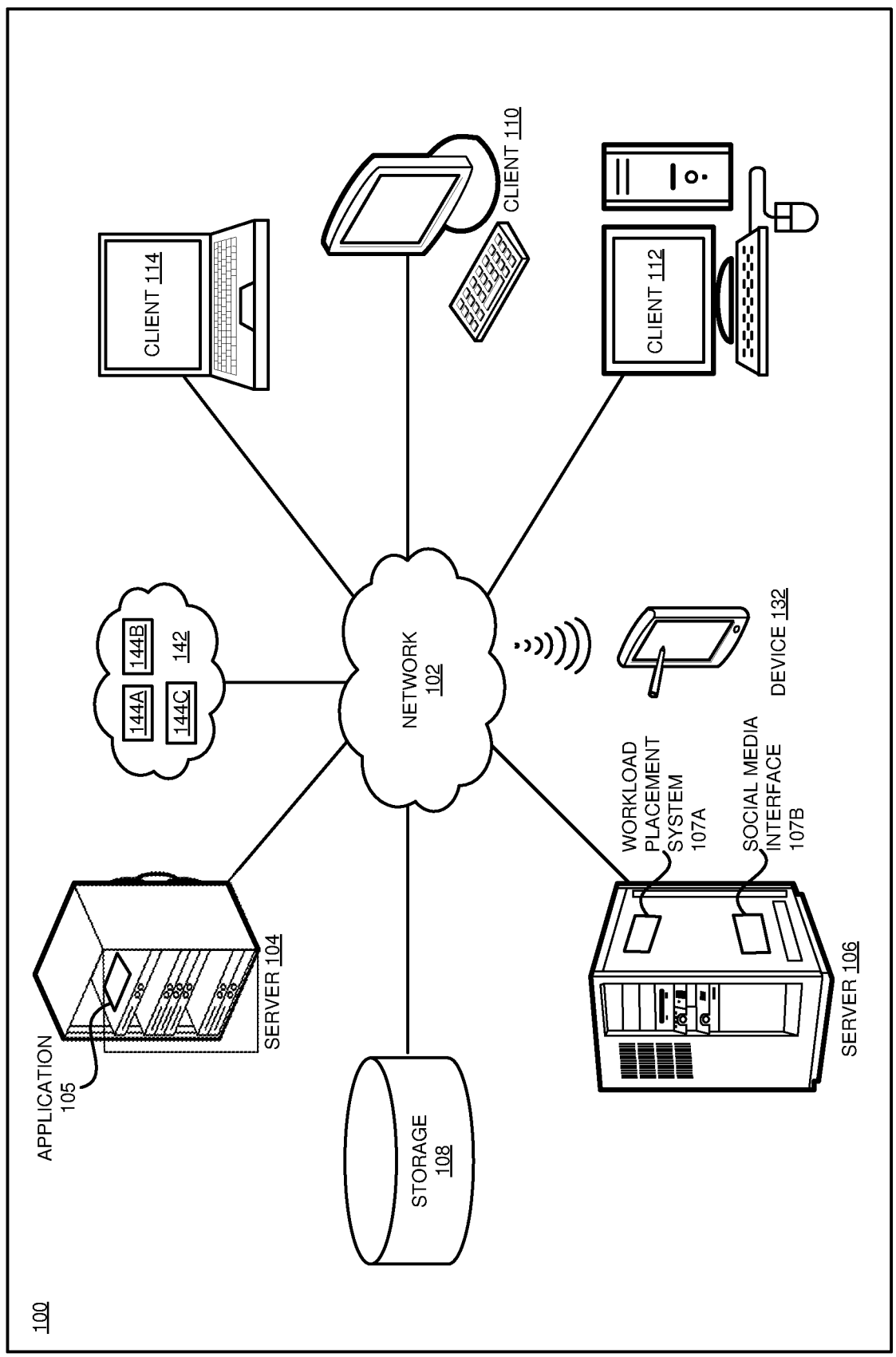
FIG. 1 depicts a block diagram of a network of data processing systems in which illustrative embodiments may be implemented.

The illustrative embodiments recognize that many workload placement techniques presently exist, which attempt to place or resolve a given workload to a suitable data processing system while satisfying one or more objectives of a data processing environment. For example, workload placement in a cluster attempts to satisfy an objective to maximize a utilization parameter of a resource, minimize a latency parameter of the workload, maximize the up-time parameter of an application, minimize the operating cost of a tenant of the data processing environment, and many others.

Some objectives are specific to a tenant of a data processing environment. Such an objective is called a context-dependent objective. A tenant provides a context within which the objective has to be met. For example, a tenant or context may specify an objective that the performance of the tenant's workload should be maximized up to a cost threshold but not necessarily by minimizing the cost.

Some objectives are not specific to a context but are generally applicable to the data processing environment as a whole. Such an objective is called a context-independent objective. For example, a data processing environment, such as a datacenter is generally interested in maximizing the utilization of the resources available in the datacenter.

Some context-dependent objectives and context-independent objectives can be mutually conflicting. For example, the context-independent objective that maximizes the utilization can degrade the performance below a threshold set by a context-dependent objective. Some context-dependent objectives and context-independent objectives are complementary to one another. For example, a context-independent objective may minimize cost of operation across the datacenter, which is complementary to a cost minimization context-dependent objective of a tenant.

The illustrative embodiments recognize that geographical location of a workload is a significant consideration in workload resolution. Presently, data processing environments attempt to locate data geographically close to a consumer in an effort to reduce the latency in consuming that data. However, the present techniques for ascertaining the geographical location of a workload does not take into account social aspects of the user-interactions with the workload.

The illustrative embodiments further recognize that social interaction of the users with the workload is a dynamic condition, which can change from time to time, place to place, event to event, and user-group to user-group. The illustrative embodiments recognize that the present techniques do not adjust the geographical location of the workload based on sentiments of the user interacting with the workload.

Similarly, many other objectives associated with a workload are affected by social aspects. For example, while a context-dependent objective may accept performance values within a specified range, the social sentiment of the user-interactions with the workload might only be favorable within a relatively narrower band. Objectives such as stability, partition tolerance, application-user latency, application-application latency, parallel availability, continuous availability, cost, desired system properties, provisioning parameters, core or other resource utilization, wait times, and other objectives related to the resolution of a workload can also similarly depend on social aspects of the user-interactions with the workload. The illustrative embodiments recognize that initial resolution of a workload and an ongoing change in the workload resolution should take into consideration the social media data and the sentiment expressed therein, in the process of satisfying other objectives. The presently used techniques for workload resolution do not take into consideration the social media data and the sentiment expressed therein, in the process of satisfying workload deployment objectives.

The illustrative embodiments used to describe the invention generally address and solve the above-described problems and other problems related to identifying objects of interest in transformed images.

An embodiment can be implemented as a software application. The application implementing an embodiment can be configured as a modification of an existing workload placement system, as a separate application that operates in conjunction with an existing workload placement system, a standalone application, or some combination thereof.

A user who interacts with a workload contributes social media data to a social media system. Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional messages, or bi-directional or broadcast communications in a variety of languages and forms. Such communications in the social media data can include proprietary conversational styles, slangs or acronyms, urban phrases in a given context, formalized writing or publication, and other structured or unstructured data.

A user's contributions to the social media—the social media data—can include any type or size of data. For example, a user can tweet or post text, pictures, videos, multimedia content, links, or combinations of these and other forms of information to a social media website. Furthermore, such information can be posted in any order, at any time, for any reason, and with or without relation to any event.

Social media data, such as a tweet or a post by a user can include, but need not necessarily include, geographical location information about the location from where the post originated. For example, a user tweeting from Wimbledon stadium in London, UK, can include location data such as the latitude and longitude of a point in the Wimbledon stadium, the name 'Wimbledon stadium', or a combination thereof. The content of the tweet can express the sentiment of the user at the time of the tweet, can state or suggest the location from where the user tweeted, or both.

For example, a textual content of an example tweet might be "Fantastic day for a match". The tweet in relation to other information, such as other tweets by the user or data pertaining to the same period from other sources, can be analyzed using Natural Language Processing (NLP), to determine that the user is talking about being present at the Wimbledon stadium to watch a tennis match. Similarly, as another example, a picture, video, or multimedia content of an example tweet might depict a grass tennis court. The tweet in relation to other information, such as other tweets by the user or data pertaining to the same period from other sources, can be analyzed using image processing, audio processing, or other multimedia processing, to determine that the user is likely a spectator at the Wimbledon stadium.

Consider, as an example, that a workload is covering a tennis tournament at the Wimbledon stadium, such as by analyzing the plays, providing statistics and scores, and servicing other tennis-related needs of a group of users. A user may be interacting with a workload when tweeting or posting social media data. Based on the expressly stated geographic location in the social media data, or based on a geographic location deduced from an analysis in the manner described herein, an embodiment determines the geographic location of the user. Similarly, using known NLP techniques and other techniques, an embodiment analyzes the social media data of a user to determine the user's sentiment in the social media data.

By collecting location information about a set of users who are interacting with a workload, or who are expected to interact with a workload, an embodiment determines a location that most applies to the set of users. For example, the embodiment applies a suitable function to the locations of the users in the set to compute a location of the set as a whole. As a non-limiting example, the function may specify a threshold number, and the location corresponding to the threshold number of users in the set becomes the location of the set. similarly, any suitable function can be applied to the various locations of the various users to compute a location that is applicable to the set of users.

An embodiment computes the geographical distance between the location of the set of users computed from the social media data, and the geographical location of a data processing system in the cloud. The data processing system may be a selected system where the workload may be initially placed, or may be a system where the workload has been previously placed.

In some cases, minimization of this geographical distance can be a context-dependent objective, context-independent objective, or both. Over a period of interactions with the workload, this geographical distance can change, e.g., due to the movement of the set of users. An embodiment receives live or current social media data contributed by the set of users, recomputes the geographical distance, evaluates whether the objective is no longer met by the changed distance, and moves the workload to a different data processing system or node to continue meeting the objective.

The content of the tweet can express the sentiment of the user at the time of the tweet towards an event related to the workload or a function of the workload. Suppose, as an example that the workload presents an interface to a user in which the workload presents ball-speeds with each play in a tennis match. Suppose, as an example, that the workload is tracking a Wimbledon tennis match event, and displays "40 mph" as the speed of the ball during one volley. The user reacts to the data presented by the workload.

For example, a textual content of an example tweet by the user might be "I do not understand 40 mph!" this content in relation to other information, such as a previous tweet "Fantastic day for a match", or data pertaining to the same period from other sources, can be analyzed using Natural Language Processing (NLP), to determine that the user is expressing a negative sentiment towards data "40 mph" while being present at the Wimbledon stadium to watch a tennis match. Similarly, as another example, a picture, video, or multimedia content of an example tweet might depict a screenshot of the workload interface with a frustrated expression doodled around data "40 mph" presented in the interface. Similarly, the user can post a frustrated sound, a negative audio remark, a video of the user showing frustration, and the like relative to the example data "40 mph". The tweet in relation to other information can be analyzed using image processing, audio processing, or other multimedia processing, to determine that the user is likely expressing a negative sentiment towards the workload as a spectator at the Wimbledon stadium.

Based on the computed sentiment, an embodiment analyzes regional features associated with the placement of the workload. It may be, for example, that the event being covered by the workload is occurring in England but the workload is resolved to a node in the United States and therefore using imperial units of measurements. Users spectating the event in England are accustomed to seeing the metric units. Thus, the embodiment concludes that the placement of the workload should be changed to a region where metric units are configured for the workload.

By computing and collecting sentiment information about a set of users who are interacting with a workload, or who are expected to interact with a workload, an embodiment determines a region that maximizes a positive sentiment as an objective, minimizes a negative sentiment as an objective, or both. An embodiment computes a region where the workload should be placed according to the sentiments in the social media data, and the region of a data processing system in the cloud. The data processing system may be a selected system where the workload may be initially placed, or may be a system where the workload has been previously placed.

In some cases, minimization of a geographical distance between the two regions can be a context-dependent objective, context-independent objective, or both. Over a period of interactions with the workload, this geographical distance can change, e.g., due to the movement of the set of users. An embodiment receives live or current social media data contributed by the set of users, recomputes the geographical distance, evaluates whether the objective is no longer met by the changed distance, and moves the workload to a different data processing system or node to continue meeting the objective.

Note that the specific sentiment, specific data that triggers the specific sentiment, the manner of computing the specific sentiment, the regional basis of the sentiment, and other example features are only non-limiting examples to illustrate the operations of an embodiment. Other sentiments can be expressed relative to other aspects of a workload in a similar manner and the same are contemplated within the scope of the illustrative embodiments.

An embodiment also evaluates any number of other selected objectives in view of the region and location-based objectives as described herein. For example, if a cost minimization objective is selected, the embodiment computes the location of one or more nodes that meet the location objective according to the social aspect of distance, meets the region objective according to the sentiment aspect of distance, or some combination thereof, in conjunction with the cost as can be minimized at those one or more nodes. Objectives related to performance, utilization, and other cloud computing considerations can also be similarly evaluated by adapting an embodiment in a suitable manner.

Some example objectives can be implemented in the non-limiting manners shown below—

CAP objective functions:
Availability:

$$leastAvailableComponent = minimum\left(\forall n \in C\left(\prod_{i=1}^{n} ComponentAvailability_i\right)\right) : C = set\ of\ components$$

$$0.0 \leq leastAvailableComponent \leq 100.0$$

$$objective_{lac} = maximize(leastAvailableComponent)$$

Partition Tolerance:

$$ParallelAvailability = 1 - \left(\prod_{i=1}^{N} (1 - ComponentAvailability_i)\right)$$

$$0.0 \leq ParallelAvailability \leq 100.0$$

$$objective_{pt} = maximize(ParallelAvailability)$$

Consistency:

$$updateTime = \frac{1}{M}\sum_{j=1}^{M} ((|updateSignalEpoch - updateEpoch_j|)^{penalty});$$

$$penalty \geq 1$$

$$0.0\ s \leq updateTime \leq 2678400.0\ s$$

$$objective_{ut} = minimize(updateTime)$$

Availability objective functions:
High Availability:

$$SerialAvailability = \prod_{i=1}^{N} ComponentAvailability_i$$

$$ParallelAvailability(SerialAvailability) = 1 - \left(\prod_{i=1}^{N} (1 - SerialAvailability_i)\right)$$

-continued $HighAvailability = ParallelAvailability(SerialAvailability)$ $0.0 \le HighAvailability \le 100.0$ $objective_{pa} = maximize(ParallelAvailability)$ Continuous Operations:

$$ContinuousOperations(x) = \begin{Bmatrix} 0 \text{ for } x < 0 \\ 1 \text{ for } x \ge 0 \end{Bmatrix}$$

Continuous Availability:

ContinuousAvailability(ContinuousOperations, HighAvailability,x)=ContinuousOperations(x)*HighAvailability $0.0 \le ContinuousAvailability \le 100.0$ $objective_{ca} = maximize(ContinuousAvailability)$ Cost objective function:

$$cost = \sum_{i=1}^{N} flatComponentCost_i +$$
$$\sum_{k=1}^{M} apiRate_k * \#calls_k + \sum_{h=1}^{H} computeRate_h * \#time_h +$$
$$\sum_{s=1}^{S} specificCloudCostsRate_s * \#used_s + labor_{cost}$$

$\$0 \le cost \le \$1,000,000$ $objective_c = minimize(cost)$

Geographical objective functions:

$$socialContentOriginationDistance_i =$$
$$\frac{1}{Tweets} \sum_{t=1}^{Tweets} haversine(tweetLat_t, tweetLong_t, podLat_i, podLong_i)$$

$0 \text{ km} \le socialContentOriginationDistance_i \le 12756.0 \text{ km}$ $objective_{scod} = minimize(i \in I)$; $I$ is the list of all computing pods $$multimediaContentOriginationDistance_i =$$
$$\frac{1}{FaceImages} \sum_{f=1}^{FaceImages} haversine$$
$$((playerHomeCountry(facialRecognition(image_f)), podLat_i, podLong_i)$$

$0 \text{ km} \le multimediaContentOriginationDistance_i \le 12756.0 \text{ km}$ $objective_{mmcod} = minimize(i \in I)$; $I$ is the list of all computing pods $$webTrafficContentOriginationDistance_i =$$
$$\frac{1}{web} \sum_{w=1}^{web} haversine(webLat_w, webLong_w, podLat_i, podLong_i)$$

$0 \text{ km} \le webTrafficContentOriginationDistance_i \le 12756.0 \text{ km}$ $objective_{wtcod} = minimize(i \in I)$; $I$ is the list of all computing pods System objective functions:

$(0 \le systemUtility \le 8) \in Z$ $systemUtility(\vec{x}, plat\vec{f}orm) = f_{RAM}(x_1, platform_1) +$
$f_{cores}(x_2, platform_2) + f_{disk}(x_3, platform_3) + f_{diskType}(x_4, platform_4) +$
$f_{networkSpeed}(x_5, platform_5) + f_{networkType}(x_6, platform_6) +$
$f_{networkClustering}(x_7, platform_7) + f_{diskSpeed}(x_8, platform_8)$ $objective_{systemUtility} = maximize(systemUtility(\vec{x}, plat\vec{f}orm))$ $\vec{f} = setofallbinarysystemequations$ $$systemRequirements(\vec{x}, plat\vec{f}orm) = \sum_{i=0}^{|\vec{f}|} f_i(\vec{x}, plat\vec{f}orm)$$

$objective_{systemRequirements} = systemRequirements(\vec{x}, plat\vec{f}orm) = |\vec{f}|$ Performance objective functions:

$$provisionTime(service) = \sum_{s=0}^{|service|} provisionTime_s$$

$objective_{provisionTime} = minimize(provisionTime(service))$ $$responseTime(service) = \sum_{s=0}^{|service|} responseTime_s$$

$objective_{responseTime} = minimize(responseTime(service))$ $$e2eLatency(service) = \frac{1}{|service|} \sum_{s=0}^{|service|} e2eLatency_s$$

$objective_{e2eLatency} = minimize(e2eLatency(service))$ $$\% CPUBusy(cores) = \frac{1}{|cores|} \sum_{c=0}^{|cores|} \% CPUBusy_c$$

$objective_{\%CPUBusy} = minimize(\% CPUBusy(cores))$ $$IOWaitTime(threads) = \sum_{t=0}^{|threads|} IOWaitTime_t$$

$objective_{IOWaitTime} = minimize(IOWaitTime(threads))$ $$\% MemoryUsed(service) = \frac{1}{|service|} \sum_{s=0}^{|service|} \% MemoryUsed_s$$

$objective_{MemoryUsed} = minimize(MemoryUsed(service))$ $$incomingNetworkSpeed(nics) = \frac{1}{|nics|} \sum_{n=0}^{|nics|} incomingNetworkSpeed_n$$

$objective_{incomingNetworkSpeed} = maximize(incomingNetworkSpeed(nics))$ $$outgoingNetworkSpeed(nics) = \frac{1}{|nics|} \sum_{n=0}^{|nics|} outgoingNetworkSpeed_n$$

$objective_{outgoingNetworkSpeed} = maximize(outgoingNetworkSpeed(nics))$

End of the example implementations section.

Any number of context-dependent objectives and context-independent objectives can be selected in any permissible combination. Certain combinations of objectives may be wither impermissible by policy or may be impractical according to a theorem or law of computing. For example, Consistency, Availability, and Partition tolerance (CAP) theorem provides that it is impossible for a distributed data processing environment to simultaneously provide all three of the following guarantees—Consistency (all nodes see the same data at the same time), Availability (every request receives a response about whether it succeeded or failed), and Partition tolerance (the system continues to operate despite arbitrary partitioning due to network failures). Accordingly, for example, objectives to maximize consistency, availability, and partition tolerance cannot all be simultaneously selected.

A method of an embodiment described herein, when implemented to execute on a device or data processing system, comprises substantial advancement of the functionality of that device or data processing system in resolving workloads using social objectives in a cloud data processing environment. For example, presently available methods for workload placement rely mostly on data processing environment objectives and tenant objectives but not on social aspects of the users who interact with the workload. An embodiment determines the geographical distance between the workload node and the users using the users' social media data. An embodiment further determines the suitability of the location, type, configuration, utilization, and many other factors of the workload node based on the sentiments extracted from the users' social media data. An embodiment selects a node for resolving the workload by using these social aspects of the social media data of the users in conjunction with other context-dependent objectives and context-independent objectives selected in a particular implementation. This manner of social objectives-based workload resolution in a cloud environment is unavailable in the presently available methods. Thus, a substantial advancement of such devices or data processing systems by executing a method of an embodiment is in social objectives based resolution of workloads in a cloud computing environment.

The illustrative embodiments are described with respect to certain types of data processing environment, workloads, events, objectives, social media systems, social media data, analyses, functions, considerations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
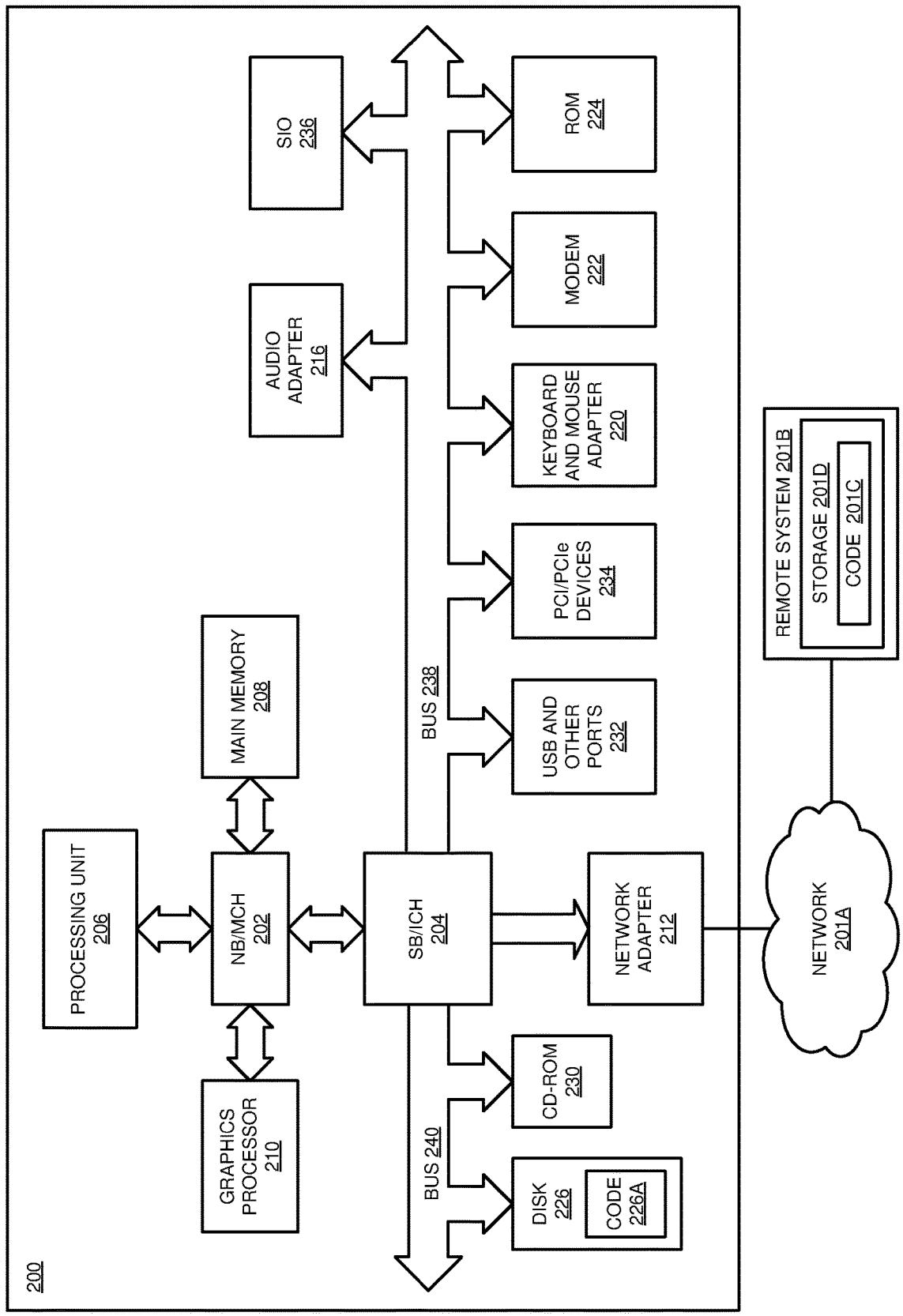
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Cloud 142 comprises node 144A, node 144B, and so on until node 144C. Workload placement system 107A manages the resolution of workloads in cloud 142, such as by placing, deploying, or moving a workload on node 144A in cloud 142. Social media interface 107B allows application 105 to obtain social media data from a social media system (not shown), for use in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
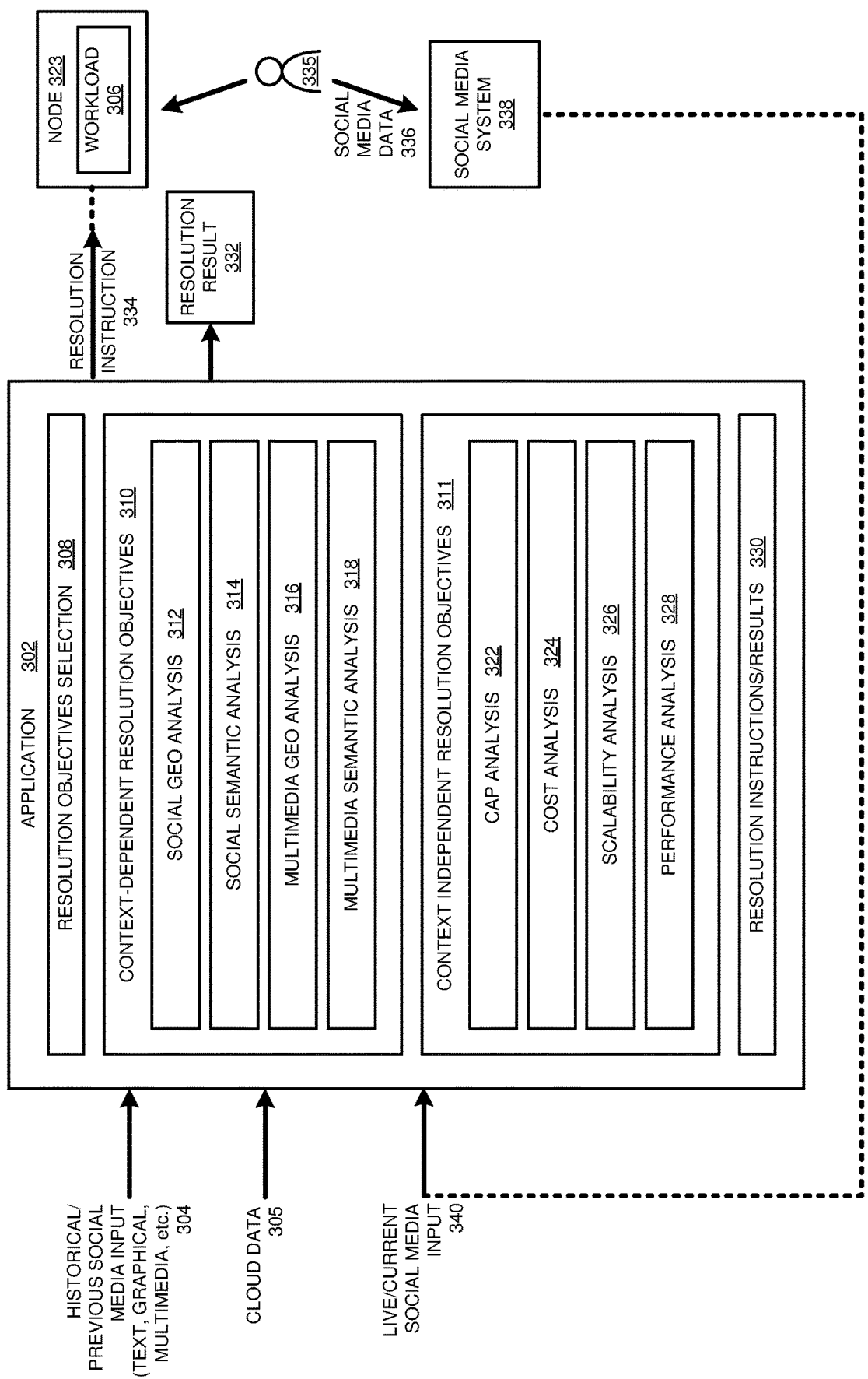
FIG. 3 depicts a block diagram of an example configuration for social objectives-based workload resolution in a cloud environment in accordance with an illustrative embodiment.

With reference to FIG. 3, this figure depicts a block diagram of an example configuration for social objectives-based workload resolution in a cloud environment in accordance with an illustrative embodiment. Application 302 is an example of application 105 in FIG. 1. Input 304 includes already available social media data that is related to the users who have interacted with workload 306 or a similar workload in the past.

Only as an example, and not to imply any limitation thereto, various analyses corresponding to various objectives are categorized as context-dependent objectives or context-independent objectives. The analyses listed as context-dependent objectives and other similar analyses need not necessarily be context-dependent objectives, and can be context-independent objectives, or both context-dependent objectives and context-independent objectives. Similarly, analyses listed as context-independent objectives and other similar analyses need not necessarily be context-independent objectives, and can be context-dependent objectives, or both context-dependent objectives and context-independent objectives.

Furthermore, only some of the analyses are depicted and described herein as examples. These examples of analyses and the corresponding objectives are not intended to be limiting. From this disclosure, those of ordinary skill in the art will be able to conceive many other analyses and their corresponding objectives and the same are contemplated within the scope of the illustrative embodiments.

Component 308 allows an administrator of cloud services to select the objectives that apply to a given workload. For example, an objective can be selected by selecting an objective function implementing the objective, as described herein. Component 308 allows selection of some of the objectives described herein, a range or value to be achieved for each selected objective, any dependency or relationship that must be satisfied between two or more selected objectives, a policy or law that must be enforced in the selection, and so on.

Suppose that component 308 selects some objectives that are context-dependent objectives and some objectives that are context-independent objectives. Accordingly, component 310 configures the selected context-dependent objective functions and component 311 configures the selected context-independent objective functions.

As an example, suppose that a social distance objective is selected. Accordingly, component 310 selects subcomponent 312, which implements a social geo analysis function. The social geo function computes a haversine distance between a user (or user group) and a cloud node, using textual data and/or expressly available geographical information of the location of the origin of social media data 304, in a manner described herein.

Similarly, suppose that a social sentiment objective is selected. Accordingly, component 310 selects subcomponent 314, which implements a social semantic analysis function. The social semantic function computes a sentiment of a user (or of a user group), using textual data of the social media data 304, in a manner described herein.

Suppose that in this example scenario, not only the textual data of social media data 304, but any multimedia data present in social media data 304 should also be analyzed for the distance and sentiment determination purposes. Accordingly, component 310 selects subcomponent 316, which implements a multimedia geo analysis function. The multimedia geo function computes a haversine distance between a user (or user group) and a cloud node, by analyzing the multimedia data and/or expressly available geographical information of the location of the origin of social media data 304, in a manner described herein.

Similarly, to determine a social sentiment using multimedia analysis, component 310 selects subcomponent 318, which implements a multimedia semantic analysis function. The multimedia semantic function computes a sentiment of a user (or of a user group), using multimedia data of the social media data 304, in a manner described herein.

Suppose that in the example scenario, one or more other objectives are selected. For example, one or two of the CAP objectives may be selected. Accordingly, component 311 selects subcomponent 322, which implements one or more of the consistency, availability, and partition tolerance functions. Subcomponent 322 uses cloud data 305, in a manner described herein and suggests one or more nodes that satisfy the selected CAP objectives. Cloud data 305 includes data about a set of parameters corresponding to one or more nodes operating in the given cloud environment, such as node 323.

As another example, a cost objective may be selected. Accordingly, component 311 selects subcomponent 324, which implements a cost objective function and computes the cost of resolving workload 305 to one or more nodes, such as to node 323, using cloud data 305, in a manner described herein. Subcomponent 324 suggests one or more nodes that satisfy the cost objective.

As another example, a scalability objective may be selected. Accordingly, component 311 selects subcomponent 326, which implements a scalability objective function and computes a scalability parameter of resolving workload 305 to one or more nodes, such as to node 323, using cloud data 305, in a manner described herein. Subcomponent 326 suggests one or more nodes that satisfy the scalability objective.

As another example, a performance objective may be selected. Accordingly, component 311 selects subcomponent 328, which implements a performance objective function and computes a performance parameter of resolving workload 305 to one or more nodes, such as to node 323, using cloud data 305, in a manner described herein. Subcomponent 326 suggests one or more nodes that satisfy the performance objective.

Component 330 presents the set of nodes that result from the various selected analyses. Resolution result 332 includes one or more nodes and the values of the various objectives that are satisfied by each of those nodes. Result 332 allows an administrator to select a node for resolving the workload while satisfying the selected objectives quickly.

Optionally, component 330 may also produce resolution instructions 334. Resolution instructions 334 are usable to resolve or place workload 305 on a node, e.g., node 323, which appears in resolution result 332.

Once workload 305 is resolved to node 323, user 335 or a group thereof interacts with workload 305. User 335 contributes social media data 336 to social media system 338. System 338 provides live or current social media data as input 340 to application 302.

Application 302 uses input 340 in a manner similar to input 304 to determine whether workload 305 remains correctly resolved at node 323 and satisfies the selected objective functions in a manner described herein. If the resolution of workload 305 at node 323 is no longer correct in that the resolution no longer satisfies the selected objective functions according to input 340, application 302 performs the analyses as described herein and creates a different resolution result 332, a different resolution instruction 334, or both, to re-resolve workload 305 to a different node in the cloud.

Figure 4:
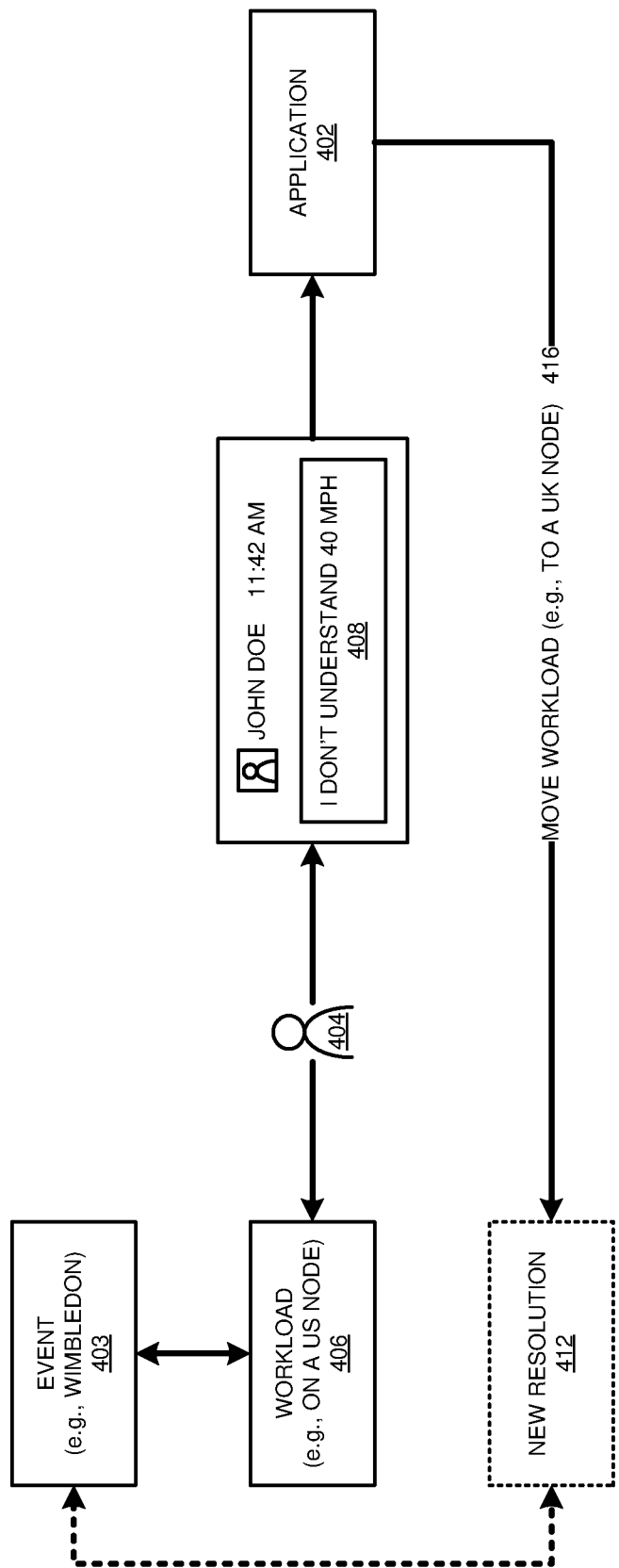
FIG. 4 depicts a block diagram of an example operation for social objectives-based workload resolution in a cloud environment in accordance with an illustrative embodiment.

With reference to FIG. 4, this figure depicts a block diagram of an example operation for social objectives-based workload resolution in a cloud environment in accordance with an illustrative embodiment. Application 402 is an example of application 302 in FIG. 3.

Recall the example of a Wimbledon match described earlier. Suppose that event 403 is the match being played at Wimbledon, which is being spectated by group of users 404. Workload 406 is configured to provide some information related to event 403 to users 404.

Suppose that workload 406 is resolved to a node in the United States, which is configured to use the imperial system. Accordingly, on a play, workload 406 presents data "40 mph" for the speed of the ball to user 404. User 404 tweets textual data 408, which reads, "I don't understand 40 mph".

Application 402 analyzes textual data 408 to determine the negative sentiment therein. Based on the sentiment, application 402 computes new resolution 412 for workload 406. As an example, the node selected for new resolution 412 may be located in a region that uses the metric system. Application 402 moves workload 406, or causes workload 406 to be moved to the node for new resolution 412.

Figure 5B:
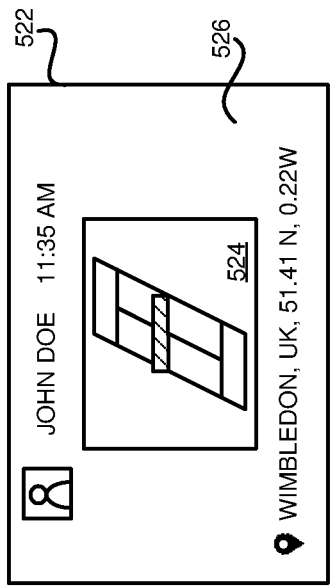
FIG. 5B depicts a block diagram of another example social media data usable for social geo analysis in a manner described herein.
Figure 5A:
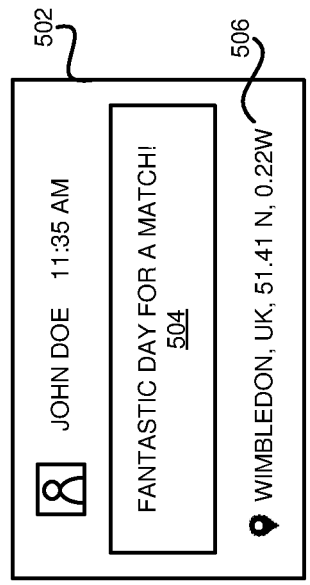
FIG. 5A depicts a block diagram of an example social media data usable for social geo analysis in a manner described herein.

With reference to FIG. 5A, this figure depicts a block diagram of an example social media data usable for social geo analysis in a manner described herein. Social media data 502 can be a part of input 304 or input 340 in FIG. 3.

Social media data 502 includes textual data 504 and location data 506. An embodiment, such as an embodiment implemented in application 402 in FIG. 4, uses textual data 504 alone, location data 506 alone, or both textual data 504 and location data 506 in a textual analysis to determine a location of the user who contributes social media data 502.

With reference to FIG. 5B, this figure depicts a block diagram of another example social media data usable for social geo analysis in a manner described herein. Social media data 522 can be a part of input 304 or input 340 in FIG. 3.

Social media data 522 includes multimedia data 524 and location data 526. An embodiment, such as an embodiment implemented in application 402 in FIG. 4, uses multimedia data 524 alone, location data 526 alone, or both multimedia data 524 and location data 526 in a multimedia analysis to determine a location of the user who contributes social media data 522.

Figure 6B:
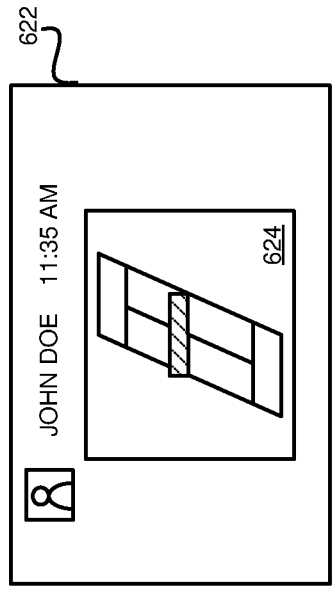
FIG. 6B depicts a block diagram of another example social media data usable for social geo analysis in a manner described herein.
Figure 6A:
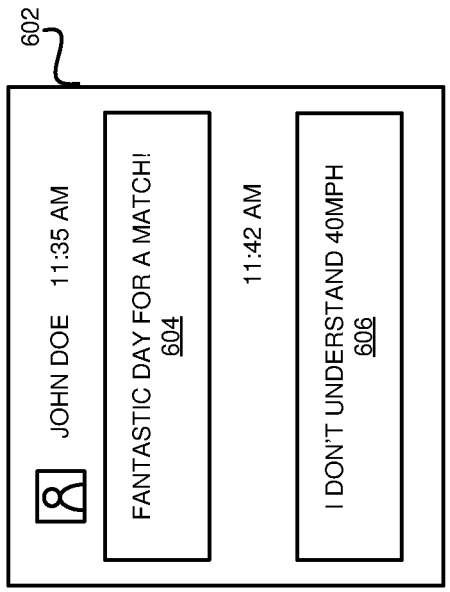
FIG. 6A depicts a block diagram of an example social media data usable for social geo analysis in a manner described herein.

With reference to FIG. 6A, this figure depicts a block diagram of an example social media data usable for social geo analysis in a manner described herein. Social media data 602 can be a part of input 304 or input 340 in FIG. 3.

Social media data 602 includes textual data 604 and no location data. An embodiment, such as an embodiment implemented in application 402 in FIG. 4, uses textual data 604 in a textual analysis to determine a location of the user who contributes social media data 602. For example, the embodiment uses textual data 604 and 606, both contributed by the same user, to determine the context of textual data 604 and 606, and deduce that the location of the user is likely to be at the Wimbledon stadium for spectating a tennis match.

With reference to FIG. 6B, this figure depicts a block diagram of another example social media data usable for social geo analysis in a manner described herein. Social media data 622 can be a part of input 304 or input 340 in FIG. 3.

Social media data 622 includes multimedia data 624 and no location data. An embodiment, such as an embodiment implemented in application 402 in FIG. 4, uses multimedia data 624 in a multimedia analysis to determine a location of the user who contributes social media data 622. For example, using the image of a grass tennis court in multimedia data 624, along with the time of tweet 622 and other data from other sources about tennis courts that are hosting some events at that time, the embodiment deduces that the location of the user is likely to be at the Wimbledon stadium for spectating a tennis match.

Figure 7:
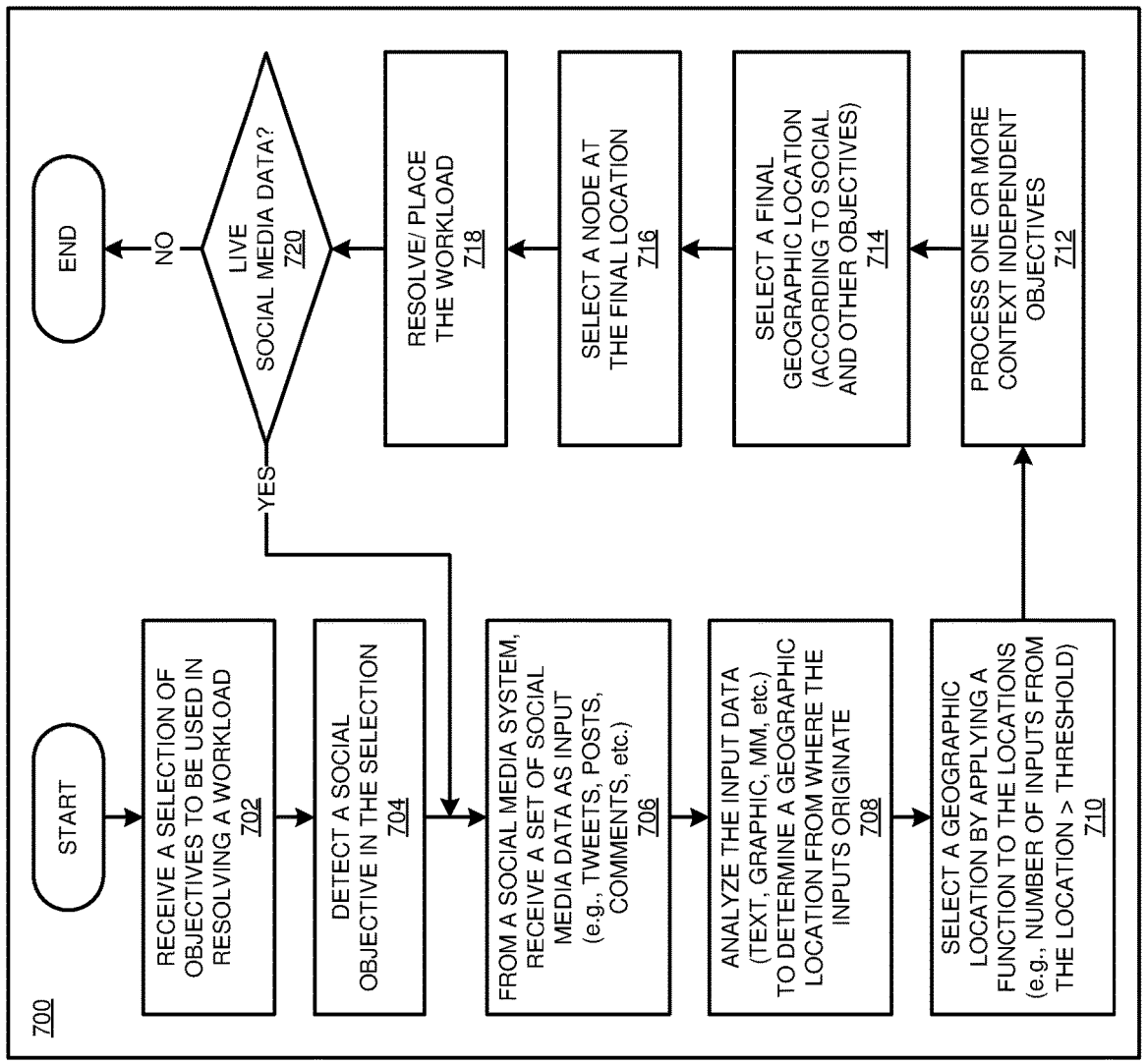
FIG. 7 depicts a flowchart of an example process for social objectives-based workload resolution in a cloud environment in accordance with an illustrative embodiment.

With reference to FIG. 7, this figure depicts a flowchart of an example process for social objectives-based workload resolution in a cloud environment in accordance with an illustrative embodiment. Process 700 can be implemented in application 402 in FIG. 4.

The application receives a selection of objectives to be used in resolving a workload (block 702). The application detects a social objective in the selection (block 704).

The application receives a set of social media data as input from a social media system (block 706). For an initial resolution, the social media data is related to users who have interacted with the workload or a similar workload in the past.

The application analyzes the input social media data, e.g., the textual and/or multimedia content therein, to determine a geographical location from where the input data originates (block 708). The application selects a geographical location by applying a function to the locations of origin computed from the social media data (block 710).

If one or more context-independent objectives are also selected, the application processes such one or more context-independent objectives (block 712). Note that some of the context-independent objectives may also cause a selection of a location. Therefore, the application selects a final geographical location for the resolution by using in a function the location computed from social media data and any location output from a context-independent objective (block 714). The application selects a node at the final location (block 716). The node is selected such that the node satisfies all the selected objectives -social objectives, context-dependent objectives, context-independent objectives, or a combination thereof. The application resolves the workload to the node (block 718).

The application determines whether live or current social media data should be collected and analyzed for verifying continued suitability of the resolution (block 720). If live or current social media data should be collected and analyzed ("Yes" path of block 720), the application returns to block 706 and processes the live or current social media data to recomputing the resolution. If live or current social media data should not be collected and analyzed ("No" path of block 720), the application ends process 700 thereafter.

Thus, a computer implemented method, system or apparatus, and computer program product are provided in the illustrative embodiments for social objectives-based workload resolution in a cloud environment and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   analyzing, using a processor and a memory, a content of a social media data, the social media data relating to a workload that is to be located on a node;
   computing, using the processor and the memory, a location corresponding to the social media data, wherein the social media data is regarded as originating from the location;
   selecting, using the processor and the memory, a set of nodes by computing a social distance objective function, the set of nodes including the node, and wherein each node in the set of nodes is located within a range of distances specified by the social distance objective function;
   removing, using the processor and the memory, from the set of nodes a first subset of nodes, wherein the first subset of nodes fails to satisfy another objective function;
   selecting, using the processor and the memory, responsive to a second subset of nodes satisfying the social distance objective function and the other objective function, the node from the second subset;
   deploying, using the processor and the memory, the workload at the node;
   replacing, responsive to a sentiment value of a sentiment expressed in the content being in an undesirable range, the node with a second node; and
   migrating, as a part of the replacing, the workload from the node to the second node, wherein the social media data is related to a current interaction of users with the workload located at the node.

2. The method of claim 1, further comprising:
   performing a semantic analysis of the content to determine the sentiment value of the sentiment expressed in the content;
   selecting a social semantic objective function responsive to the sentiment value being in the undesirable range; and
   selecting the second node by computing the social semantic objective function, wherein the second node is located in a geographical region such that a configuration of the second node in the geographical region operates the second node to change the sentiment value from being in the undesirable range to a desirable range.

3. The method of claim 1, wherein the social distance objective function minimizes the distance between a geographical location of the node and the computed location corresponding to the social media data.

4. The method of claim 1, further comprising:
   determining that the social media data comprises a plurality of contributions from a corresponding plurality of users;
   determining a plurality of locations of origin corresponding to the plurality of contributions; and
   applying a function to the plurality of locations to compute the location.

5. The method of claim 1, wherein the social media data corresponds to an interaction with a second workload at a past time, the second workload having a similarity with the workload.

6. The method of claim 1, wherein the social media data corresponds to an interaction with the workload at a past time.

7. The method of claim 1, further comprising:
determining that the content is a multimedia content;
performing, a multimedia analysis of the multimedia content; and
deducing, from the multimedia analysis, a geographical location from where the social media data was contributed.

8. The method of claim 7, wherein the deducing is performed without using any location data associated with the social media data.

9. The method of claim 1, further comprising:
determining that the content is a textual content; performing, using Natural Language Processing (NLP), a textual analysis of the textual content; and
deducing, from the textual analysis, a geographical location from where the social media data was contributed.

10. The method of claim 9, wherein the deducing is performed without using any location data associated with the social media data.

11. The method of claim 1, wherein the node is a part of a geographically dispersed cloud computing environment.

12. A computer usable program product comprising one or more computer-readable medium, and program instructions stored on at least one of the one or more storage devices, the stored program instructions comprising:
program instructions to analyze a content of a social media data, the social media data relating to a workload that is to be located on a node;
program instructions to compute a location corresponding to the social media data, wherein the social media data is regarded as originating from the location;
program instructions to select a set of nodes by computing a social distance objective function, the set of nodes including the node, and wherein each node in the set of nodes is located within a range of distances specified by the social distance objective function;
program instructions to remove from the set of nodes a first subset of nodes, wherein the first subset of nodes fails to satisfy another objective function;
program instructions to select, responsive to a second subset of nodes satisfying the social distance objective function and the other objective function, the node from the second subset;
program instructions to deploy the workload at the node;
program instructions to replace, responsive to a sentiment value of a sentiment expressed in the content being in an undesirable range, the node with a second node; and
program instructions to migrate, as a part of the program instructions to replace, the workload from the node to the second node, wherein the social media data is related to a current interaction of users with the workload located at the node.

13. The computer usable program product of claim 12, further comprising:
program instructions to perform a semantic analysis of the content to determine the sentiment value of the sentiment expressed in the content;
program instructions to select a social semantic objective function responsive to the sentiment value being in the undesirable range; and
program instructions to select the second node by computing the social semantic objective function, wherein the second node is located in a geographical region such that a configuration of the second node in the geographical region operates the second node to change the sentiment value from being in the undesirable range to a desirable range.

14. The computer usable program product of claim 12, wherein the social distance objective function minimizes the distance between a geographical location of the node and the computed location corresponding to the social media data.

15. The computer usable program product of claim 12, further comprising:
program instructions to determine that the social media data comprises a plurality of contributions from a corresponding plurality of users;
program instructions to determine a plurality of locations of origin corresponding to the plurality of contributions; and
program instructions to apply a function to the plurality of locations to compute the location.

16. The computer usable program product of claim 12, wherein the computer usable code is stored in a computer readable storage device in a data processing system, and wherein the computer usable code is transferred over a network from a remote data processing system.

17. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to analyze a content of a social media data, the social media data relating to a workload that is to be located on a node;
program instructions to compute a location corresponding to the social media data, wherein the social media data is regarded as originating from the location;
program instructions to select a set of nodes by computing a social distance objective function, the set of nodes including the node, and wherein each node in the set of nodes is located within a range of distances specified by the social distance objective function;
program instructions to remove from the set of nodes a first subset of nodes, wherein the first subset of nodes fails to satisfy another objective function;
program instructions to select, responsive to a second subset of nodes satisfying the social distance objective function and the other objective function, the node from the second subset;
program instructions to deploy the workload at the node;
program instructions to replace, responsive to a sentiment value of a sentiment expressed in the content being in an undesirable range, the node with a second node; and
program instructions to migrate, as a part of the program instructions to replace, the workload from the node to the second node, wherein the social media data is related to a current interaction of users with the workload located at the node.

* * * * *